Nov. 18, 1969 R. TOBEY 3,478,985

TAPE TRANSPORT

Filed Feb. 5, 1968 3 Sheets-Sheet 1

INVENTOR.
RICHARD TOBEY
BY
FOWLER, KNOBBE
& MARTENS
ATTORNEYS.

Nov. 18, 1969 R. TOBEY 3,478,985

TAPE TRANSPORT

Filed Feb. 5, 1968 3 Sheets-Sheet 2

INVENTOR.
RICHARD TOBEY

BY
FOWLER, KNOBBE
& MARTENS
ATTORNEYS.

TAPE TRANSPORT

Filed Feb. 5, 1968 3 Sheets-Sheet 3

INVENTOR.
RICHARD TOBEY

BY
FOWLER, KNOBBE & MARTENS
ATTORNEYS.

United States Patent Office 3,478,985

Patented Nov. 18, 1969

3,478,985

TAPE TRANSPORT

Richard Tobey, Tustin, Calif., assignor to Tally Corporation, a corporation of Washington Filed Feb. 5, 1968, Ser. No. 703,056
Int. Cl. G11b *15/44*
U.S. Cl. 242—184 13 Claims

ABSTRACT OF THE DISCLOSURE

A tape transport wherein tape is loaded and unloaded at high speed from a take-up to a supply tape reel by an unbalance drive signal applied to the supply reel. A reel servo means, responsive to a buffer tape storage means which indicates the tape supply between the reels, generates a drive signal to the take-up reel to maintain a predetermined tape supply between the reels. A first reel speed balancing means reduces the drive signal to the supply reel when the drive signal supplied to the take-up reel from its reel servo is excessive, indicative that the supply reel is demanding tape from the take-up reel faster than it can supply. A second reel speed balancing means protects the tape when the unbalance signal is removed, resulting in rapid deceleration of the supply reel. This second means responds to an excessive drive signal supplied to the take-up reel, indicative that the take-up reel is not decelerating as rapidly as the supply reel, and supplies a drive signal to the supply reel to wind up the excess tape. A control means automatically switches from high speed, reel powered tape transport to capstan drive during loading and unloading of the tape transport. A reel motion predicting means varies the torque on the tape reels momentarily to effectively increase the tape storage capacity in anticipation of a reversal of the tape capstan drive.

BACKGROUND OF THE INVENTION

Field of the invention

This invention relates to improvements in magnetic tape transports.

Description of the prior art

A magnetic tape transport typically includes a tape supply reel, a tape take-up reel and a capstan drive for driving the tape in either direction between the reels. The tape path between the reels includes, in addition to the capstan drive, a read and write head and a buffer tape storage means. The buffer tape storage means isolates the tape reels from the rapid acceleration and deceleration of the capstan drive, allowing the reels the time required due to their inertia to respond to changes in velocity and direction of tape. The tape reels may be driven by servo motors responsive to the buffer tape storage means which cause the reels to take up tape supplied from the capstan drive or to supply tape thereto as indicated by the buffer tape storage means.

Tape is loaded on the above-described apparatus by threading the tape along the tape path from the supply reel and securing it to the take-up reel. The take-up reel is then manually rotated, winding tape onto the take-up reel, until the operator observes that a beginning of tape marker has been wound onto the reel. Depressing the appropriate button causes the capstan drive to engage the tape and transport it from the take-up reel to the supply reel until the beginning of tape marker appears at a predetermined point in the tape path.

Alternatively, tape may be loaded on the apparatus by attaching the tape from the supply reel to the take-up reel without threading it along the normal tape path. The tape is then manually wound onto the take-up reel until the beginning of tape marker is on the reel. Drive signals are next applied to the reels to rapidly transport tape from the take-up reel to the supply reel. During this process the tape tension between the reels will not remain constant, because the tape tension is not controlled by the buffer tape storage means and may result in damage to the tape. In addition, this rapid transport technique does not allow accurate positoning of the tape once the beginning of tape marker appears from the take-up reel due to the time required to bring the reels to a halt.

Summary of the invention

The tape transports which employ the capstan drive to advance tape between the reels under all conditions are unnecessarily time consuming during the load or rewind functions. Accordingly, the present invention provides for the safe transport of tape at a high speed between the take-up and supply reels during load or rewind. Once the tape is threaded along the tape path and wound onto the take-up reel, the capstan drive is removed from the tape path and an unbalance signal applied to the supply reel. Tape damage due to excessive tape tension between reels is obviated because the tape path still includes the buffer tape storage means which maintains a constant tape supply, or tension, between the reels.

Further a reel speed balancing means is provided to insure that tape damage is not incurred if the supply reel demands tape faster than the take-up reel can supply in response to the buffer tape storage means. The reel speed balancing means is responsive to the drive signal to the take-up reel and reduces the unbalance signal to the supply reel if the take-up reel drive signal exceeds a predetermined level.

In accordance with another aspect of the present invention, the tape is protected from damage and tangling at the termination of high speed transport between reels by insuring that a predetermined tape supply between the reels is not exceeded. The supply reel, previously driven by the unbalance drive signal, is rapidly decelerated at the end of the high speed transport. Any excessive tape supply resulting from a failure of the take-up reel to decelerate fast enough is detected by a second reel speed balancing means which supplies a drive signal to the former reel to momentarily speed up that reel and wind up the excess tape.

This invention further includes control means for selectively loading and unloading the tape using the rapid, reel powered drive of the tape between the reels to initially position the tape, followed by an automatic engagement of the tape by the capstan drive and its positioning thereby to a predetermined load or unload position.

In accordance with yet another aspect of the present invention, a reel motion predicting means is provided for use in a tape transport when the tape is being advanced between the reels by the capstan driving means. The reel motion predicting means is responsive to the direction of travel of the tape between the reels and increases the tape supply between the tape reel receiving the tape and the capstan drive means and decreases the tape supply between the reel supplying the tape and the capstan driving means. This feature of the invention effectively increases the tape storage capacity so that when the direction of tape travel is reversed by the capstan driving means, the tape reels will have a longer period of time in which to respond.

DESCRIPTION OF THE PREFERRED EMBODIMENT

The tape transport in general

Figure 1:
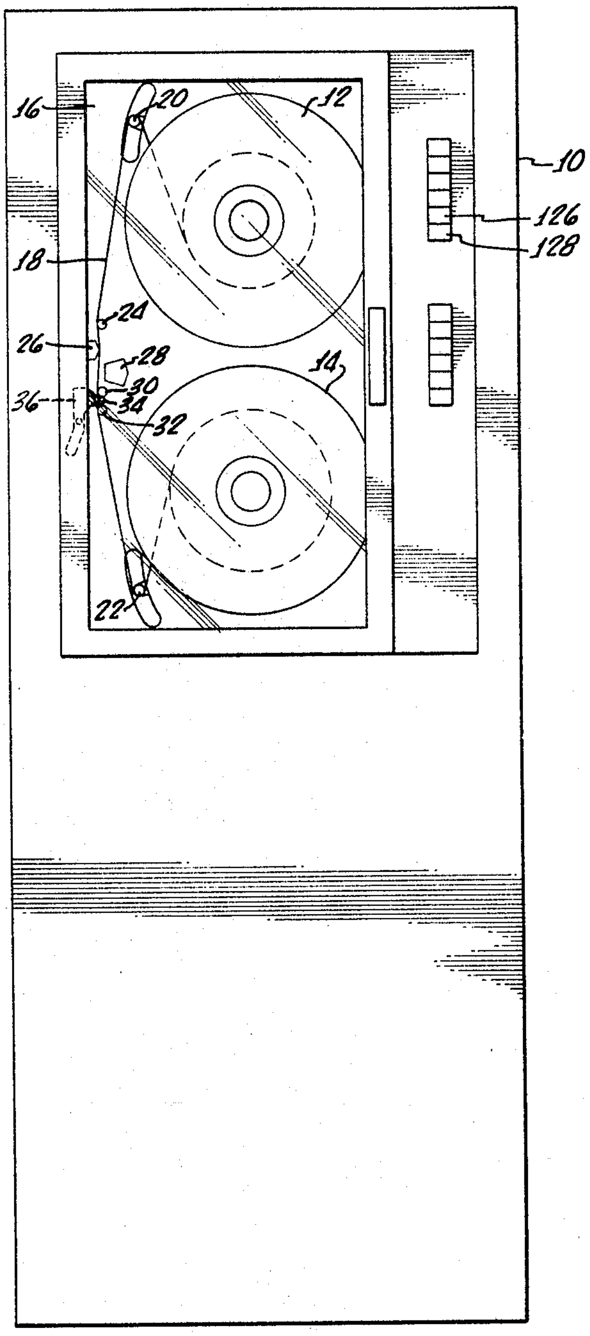
FIG. 1 is a front view of a tape transport constructed in accordance with the preferred embodiment of this invention.

Referring now to FIG. 1, there is shown a tape transport 10 having a tape supply reel 12 and a tape take-up reel 14 rotatably mounted on a tapedeck 16. A magnetic tape 18 traverses a tape path between the reels which includes buffer tape storage arm rollers 20 and 22, tape guide 24, read/write head 26, beginning of tape sensing means 28, tape guides 30 and 32, capstan drive shaft 34 and retractable tape clamp 36.

The retractable tape clamp 36 and the capstan drive shaft 34 comprise a tape driving means which controls the movement of the tape in both directions between the reels during normal operation of the tape transport 10.

Both the tape supply reel 12 and the tape take-up reel 14 are controlled by a reel servo system to accommodate rapid starts and stops of the tape 18. Advantageously, the servo system is constructed as disclosed and claimed in the co-pending U.S.A. patent application Ser. No. 653,820, entitled "Magnetic Tape Transport," filed July 17, 1967 by Richard Tobey and assigned to Dartex Division of Tally Corporation, asignee of the present application.

Figure 2:
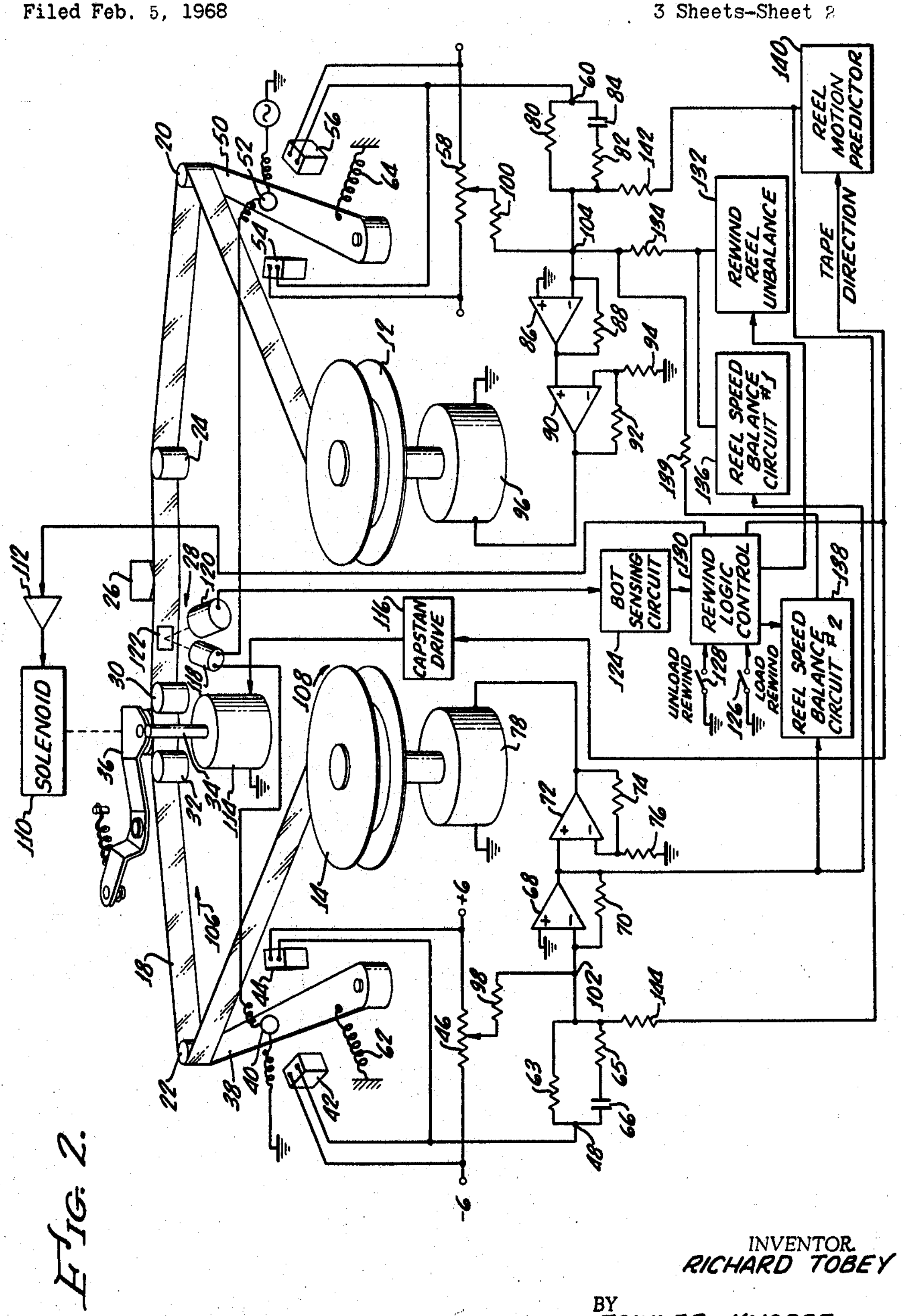
FIG. 2 is an electrical schematic and diagrammatic perspective view illustrating the preferred embodiment of the present invention.

The reel servo system, shown in more detail in FIG. 2, includes two buffer tape storage means. A first buffer tape storage means including buffer arm 38, miniature incandescent bulb 40, photosensitive devices 42 and 44, and potentiometer 46 is adapted to respond to the tape supply, or tape tension, between the take-up reel 14 and the capstan drive shaft 34 and generates a signal at point 48 proportional to the tape supply. A second buffer tape storage means including buffer arm 50, miniature incandescent bulb 52, photosensitive devices 54 and 56, and potentiometer 58 is adapted to respond to the tape supply between the supply reel 12 and the capstan drive shaft 34 and generates a signal at point 60 proportional to that supply.

Tension spring 62, attached to buffer arm 38, biases the buffer arm toward its outer limit position. The tension in tape 18 tends to move the buffer arm 38 toward its inner limit position. The position of the buffer arm 38 is detected by means of lamp 40 and photosensitive devices 42 and 44. The devices 42 and 44 are photoresistors, advantageously differentially coupled so as to provide an output signal corresponding to the difference between the output electrical characteristics of these devices and independent of any ambient light falling evenly upon the sensors 42 and 44 or variation in the output of lamp 40. The photoresistors 42 and 44 are connected together in series circuit between opposite polarity sources, typically +6 volts and −6 volts, to provide an output at node point 48 corresponding to the angular position of the light source 40. The magnitude of the voltage at node point 48 corresponds to the angular displacement of the lamp 40 and the polarity of the voltage corresponds to the direction of displacement thereof. In a like manner, tension spring 64 biases buffer arm 50 toward its outer limit position. Lamp 52 and photoresistors 54 and 56 cooperate to generate a voltage at node point 60 which indicates the direction and angular displacement of buffer arm 50.

A take-up reel servo driving means including: a phase lead network comprising resistors 63 and 65 and capacitor 66; amplifier 68 wtih its associated feedback resistor 70; amplifier 72 and its feedback resistors 74 and 76, is responsive to the signal generated at node point 48 and generates a drive signal to tape take-up reel motor 78. In a like manner, resistors 80 and 82, capacitor 84, amplifier 86, feedback resistor 88, amplifier 90 and feedback resistors 92 and 94 comprise a supply reel servo driving means responsive to the signal at node point 60 for driving supply reel motor 96.

A movable contact on the buffer arm adjust potentiometer 46 is adjusted to position the buffer arm 38 at a predetermined null position. In this position, a suitable error signal is produced at summing junction 102 by virtue of the difference between the voltage at node point 48 and the movable contact of potentiometer 46 to produce a motor torque on reel 14 sufficient to counterbalance the force of tension spring 62. Acceleration of the tape in the direction of arrow 106 by the capstan drive shaft 34 and consequent movement of the buffer arm 38 toward its inner limit will cause a change in the voltage at summing junction 48 which results in a momentary speed up of motor 78 to return the buffer arm 38 to its null position. Deceleration of the tape in the direction of arrow 106 will produce movement of the buffer arm 38 towards its out limit, resulting in a voltage at summing junction 48 which increases the torque on the take-up reel 14 in the direction of arrow 108 momentarily reducing the speed of reel 14 returning the buffer arm 38 to its null position. The servo loop associated with the supply reel 12 operates in a like manner.

During normal operation, the capstan drive shaft 34 controls the movement of the tape 18 between reels. When tape clamp 36 is in a retracted position, capstan shaft 34 is ineffective. The position of tape clamp 36 is determined by a tape clamp actuation means comprising solenoid 110 and solenoid driver 112. When solenoid 110 is actuated, tape clamp 36 is retracted from the tape path.

Capstan drive shaft 34 is fixedly attached to the armature of capstan drive motor 114. Motor 114 advantageously is a bi-directional D.C. motor driven by signals from capstan drive circuit 116. A search forward signal generated by circuit 116 will result in counter-clockwise rotation of capstan drive shaft 34 driving the tape 18 in a direction opposite arrow 106. A search reverse drive signal from capstan drive 116 will result in clockwise rotation of capstan drive shaft 34, advancing the tape in the direction of arrow 106.

The beginning of tape (BOT) sensing means 28 comprises a light source 118 and transducer 120. Transducer 120 will generate an output to BOT sensing circuit 124 when a predetermined point of the tape indicated by reflective tab 122 passes proximate the capstan.

In accordance with the present invention, the above-described apparatus is provided with two rewind sequences; a load rewind and an unload rewind.

Load rewind sequence

The load rewind sequence is employed when the tape transport 10 is being loaded for normal operation. The tape supply reel 12 is placed in position on the tape transport 10 and the tape 18 threaded along the tape path and connected to tape take-up reel 14. The operator will manually rotate take-up reel 14 until he observes that the reflective tab 122, indicating the beginning of tape, has been wound past the BOT sensor 28. The operator then actuates a load rewind switch 126. A rewind means comprising rewind logic control 130 and rewind reel unbalance 132 is responsive to the actuation of the load rewind switch 126 and will actuate the tape solenoid actuation means by generating an output from logic control 130 to the tape clamp solenoid driver 112. The solenoid 110 then retracts tape clamp 36 from the tape path, effectively removing the capstan drive shaft 34 from the tape path.

Logic control 130 then enables rewind reel unbalance circuit 132 which generates an unbalance signal that is applied to the summing junction 104 of the supply reel servo through resistor 134. This unbalance signal, when applied to the supply reel servo, results in motor 96 being driven in a counter-clockwise direction so that tape will be transported at a high speed off of the take-up reel 14 and returned to the tape supply reel 12.

When the BOT tab 122 passes in front of light source 118, transducer 120 will generate an output to BOT sensing circuit 124. Circuit 124 shapes the pulse from transducer 122 and applies it as an input to logic control 130. The logic control 130 upon receipt of the BOT signal from circuit 124 will (i) disable the reel unbalance signal generated by the rewind reel unbalance circuit 132, (ii) wait a predetermined period of time and then remove the signal applied to tape clamp solenoid driving means 112 so that the tape clamp 36 is returned to its position bearing against the capstan drive shaft 34 (the delay time between the receipt of the BOT signal by logic control circuit 130 and the deactuation of the tape clamp solenoid 110 is selected to allow the tape reels 12 and 14 to reach an equilibrium condition), and (iii) generate a signal, at the same time the tape clamp solenoid 110 is deactuated, which is applied to capstan drive 116 causing the drive circuit 116 to generate a drive signal to capstan motor 114 resulting in the tape 18 being advanced forward, that is from the tape supply reel 12 to the tape take-up reel 14.

Although the reel unbalance signal generated by the unbalance circuit 132 is removed from the summing junction 104 when the BOT tab 122 is sensed by BOT sensing circuit 124, the tape does not stop immediately due to the time required for the tape reels and their associated reel servos to reach an equilibrium state. The BOT tab 122 therefore, continues to travel toward the tape supply reel 12. Accordingly, the signal generated by the logic control 130 after the tape clamp 36 has been deactuated will cause the tape 18 to be driven forward under capstan control, returning the BOT tab 122 proximate the BOT sensing means. When the BOT tab 122 again passes in front of light source 118, transducer 120 generates a corresponding output signal to sensing circuit 124. Circuit 124 will shape this signal and apply it as an input to logic control 130. Upon receipt of this second BOT signal, logic control 130 will terminate its capstan drive signal applied to capstan drive circuit 116 stopping the movement of tape 18. From this point, normal operations such as record and playback may be initiated by the operator.

First reel speed balance circuit

During the high speed portion of the above-described load rewind operation, that is, when the rewind means generates a reel unbalance signal which is applied to summing junction 104 to transport tape from the tape take-up reel 14 to the tape supply reel 12, the tape supply reel 12 is demanding tape from the tape take-up reel 14. As the tape tension increases between reels, the buffer arm 38 is drawn inward resulting in the take-up reel motor 78 responding to allow tape to be unreeled from the take-up reel 14. During most of the high speed portion of the rewind operation, the tape take-up reel 14 is able to keep up, that is, supply as much tape as is demanded by the tape supply reel 12. However, as the tape pack on tape supply reel 12 increases in diameter, the situation may arise where the take-up reel 14 cannot unwind tape fast enough to supply the supply reel 12. When this situation occurs, the buffer arm 38 will be drawn inward towards its inner limit since the take-up reel 14 is not able to turn fast enough to return the buffer arm 38 to its null position. This condition will have a deleterious stretching effect upon the tape. Accordingly, the present invention provides a first reel speed balancing means shown in FIG. 2 as circuit 136. Circuit 136 is responsive to a particular polarity and magnitude of the output of amplifier 68 in the take-up reel servo driving means. During the portion of the high speed rewind operation that the take-up reel 14 is able to respond to the demands by the supply reel 12, the output from amplifier 68 will be within particular predetermined limits. However, when the take-up reel servo loop is not able to maintain buffer arm 38 in its null position during high speed rewind and the buffer arm 38 is drawn inward the output of amplifier 68 will have a particular polarity and exceed the magnitude of one of these limits. When this occurs the reel speed balance circuit 136 will clamp the reel unbalance signal generated by circuit 132 to a reduced level, by means of its output connected to resistor 134. As a result, the tape supply reel 12 slows down until the output from amplifier 68 indicates to circuit 136 that the tape take-up reel 14 and its associated servo loop is operating within its normal limits.

Second reel speed balance circuit

The reel unbalance signal generated by reel unbalance circuit 132 during high-speed rewind controls the voltage potential at the summation point 104; therefore, the supply reel 12 does not then respond to the movement of buffer arm 50. Accordingly, this buffer arm 50 does not maintain a null position during the high-speed portion of rewind and is biased to its inner limit by the tape tension between the tape reels. At the termination of the high-speed portion of the rewind operation, that is, when the reel unbalance signal applied to the supply reel servo loop is terminated, a large voltage will appear at node point 60 because buffer arm 50 is at its inner limit. This voltage will result in a reverse or (clockwise) torque being applied to the supply reel 12 which is rotating in a counter-clockwise direction when the reel unbalance signal is removed, causing reel 12 to be rapidly decelerated. In the event that the take-up reel servo loop does not slow down take-up reel 14 fast enough to prevent an excess of tape from being unreeled from take-up reel 14, tape may become twisted or tangled with the elements in the tape path. Accordingly, the present invention provides a second reel speed balancing means shown in FIG. 2 as circuit 138. Circuit 138 is responsive to the polarity and magnitude of the output generated by amplifier 68 in the take-up reel servo driving means. When the servo loop associated with the take-up reel 14 is able to response quickly enough to maintain the buffer arm 38 in its null position, the output from amplifier 68 will be within predetermined limits. At the termination of the high-speed portion of the rewind operation—and if the take-up reel 14 is not able to slow down fast enough to prevent an excess tape supply appearing between the reels—the buffer arm 38 will be biased to its outer limit by tension spring 62 resulting in a voltage output from amplifier 68 which exceeds the predetermined normal operation limits and has a particular polarity. Circuit 138 responds to this condition by generating an output to summing junction 104 through resistor 139. This output offsets the signal at node point 60 and thus reduces the deceleration torque applies to the supply reel 12 so that the excess tape supply between the reels is reduced. This cross-coupling of the reel servos will prevent possible damage to the tape resulting from an excess tape supply between the reels.

Reel motion predictor

A reel motion predictor means is actuated whenever the tape is moved under capstan control at the search speed, for example, during a block search operation. It is also actuated during the last part of the load rewind sequence.

The signals which are applied to capstan drive 116 to cause the tape to be moved at search speed are also connected as inputs to a reel motion predicting means indicated in the figure as circuit 140.

Reel motion predictor 140 has an output connected to the tape supply reel summing junction 104 through resistor 142 and also to the tape take-up reel summing junction 102 through resistor 144. The reel motion predicting means is responsive to the direction of travel of the tape as indicated by the drive signals to the capstan drive 116 and generates an output applied to summing junction 102 and 104 to cause the buffer arms 38 and 50 to be biased in the direction of tape travel, that is, when a search forward drive signal to capstan drive 116 is generated causing the tape 18 to be advanced from the tape supply reel 12 to the tape take-up reel 14, reel motion predictor 140 will generate an output which will cause the torque applied to take-up reel motor 78 to be reduced momentarily, causing the buffer arm 38 to be biased further toward its outer limit and will cause the torque applied to supply reel 12 to be increased momentarily in a clockwise direction, resulting in buffer arm 50 being biased further towards its inner limit. Effectively, then, as the capstan shaft 34 is advancing the tape opposite to arrow 106, the reel motion predictor means 140 will cause the tape supply between the take-up reel 14 and the capstan drive 34 to be increased and the tape supply between supply reel 12 and the capstan drive to be decreased. Inversely, when the tape is being advanced in the direction of arrow 106, the motion predictor 140 will generate an output resulting in an increased tape supply between the supply reel 12 and the capstan drive 34 and a decreased tape supply between the take-up reel 14 and the capstan drive 34. This action anticipates a change in the direction of rotation of capstan drive shaft 34 and provides the necessary alteration in tape supply between the capstan driving means and the tape reels to accommodate this change. For example, if the drive shaft 34 is rotating in a counterclockwise direction and receives a signal from the capstan drive circuit 116 to reverse direction, the increased tape supply between the drive shaft 34 and take-up reel 14 allows the reel servo loop associated with the take-up reel 14 a longer period of time in which to respond to the change of tape direction. In a like manner, since the tape supply between the driving means and the tape supply reel 12 has been decreased by biasing buffer arm 50 towards its inner limit, the buffer arm 50 has a greater capacity to accept tape from the driving means as the supply reel 12 responds to the change in tape direction.

Unload rewind sequence

The unload rewind sequence is similar to the above-described load sequence in that an unload rewind switch 128 is actuated which will result in the rewind means actuating the tape clamp solenoid 110 and generating a reel unbalance signal which is applied to summing junction 104 of the tape supply reel 12. The unbalance signal causes the supply reel 12 to rotate in a counterclockwise direction at high speed transporting tape from the take-up reel 14 to the supply reel 12. During this high-speed portion of unload rewind, the first reel speed balance circuit 136 is enabled and prevents the supply reel 12 from demanding tape from the tape-up reel 14 faster than the reel 14 can supply. When the beginning of tape tab 122 appears proximate the beginning of tape sensing means 28, the rewind means will terminate the high-speed portion of unload rewind by removing the reel unbalance signal from summing junction 104 and after a predetermined period of time, deactuate the solenoid 110 causing the tape clamp 36 to return to its position bearing against the capstan drive shaft 34. The logic control 130 then generates a search reverse signal to capstan drive 116 causing the drive motor 114 to rotate capstan drive shaft 34 in a clockwise direction and transport the tape remaining on the take-up reel 14 to the supply reel 12.

When all of the tape remaining on the take-up reel 14 has been removed, the buffer arms 38 and 50 will be biased to their outer limits by springs 62 and 64 respectively. An arm interlock means, (not shown), described in the previously referenced copending U.S.A. application Ser. No. 653,820, senses this condition and removes the drive signal to the capstan motor 114. The tape transport 10 may then be unloaded by manually retracting the tape clamp 36 and removing supply reel 12.

The difference, then, between load rewind and unload rewind is that at the termination of the high-speed portion of rewind for load rewind, the capstan drive means will cause tape to be advanced from the supply reel 12 to the take-up reel 14 until the beginning of tape tab 122 again appears proximate the beginning of tape sensing means 28. Unload rewind, on the other hand, transports all of the tape from the take-up reel 14 to the supply reel 12 so that the tape transport 10 may be unloaded.

A detailed description of the load and unload circuitry

Figure 3:
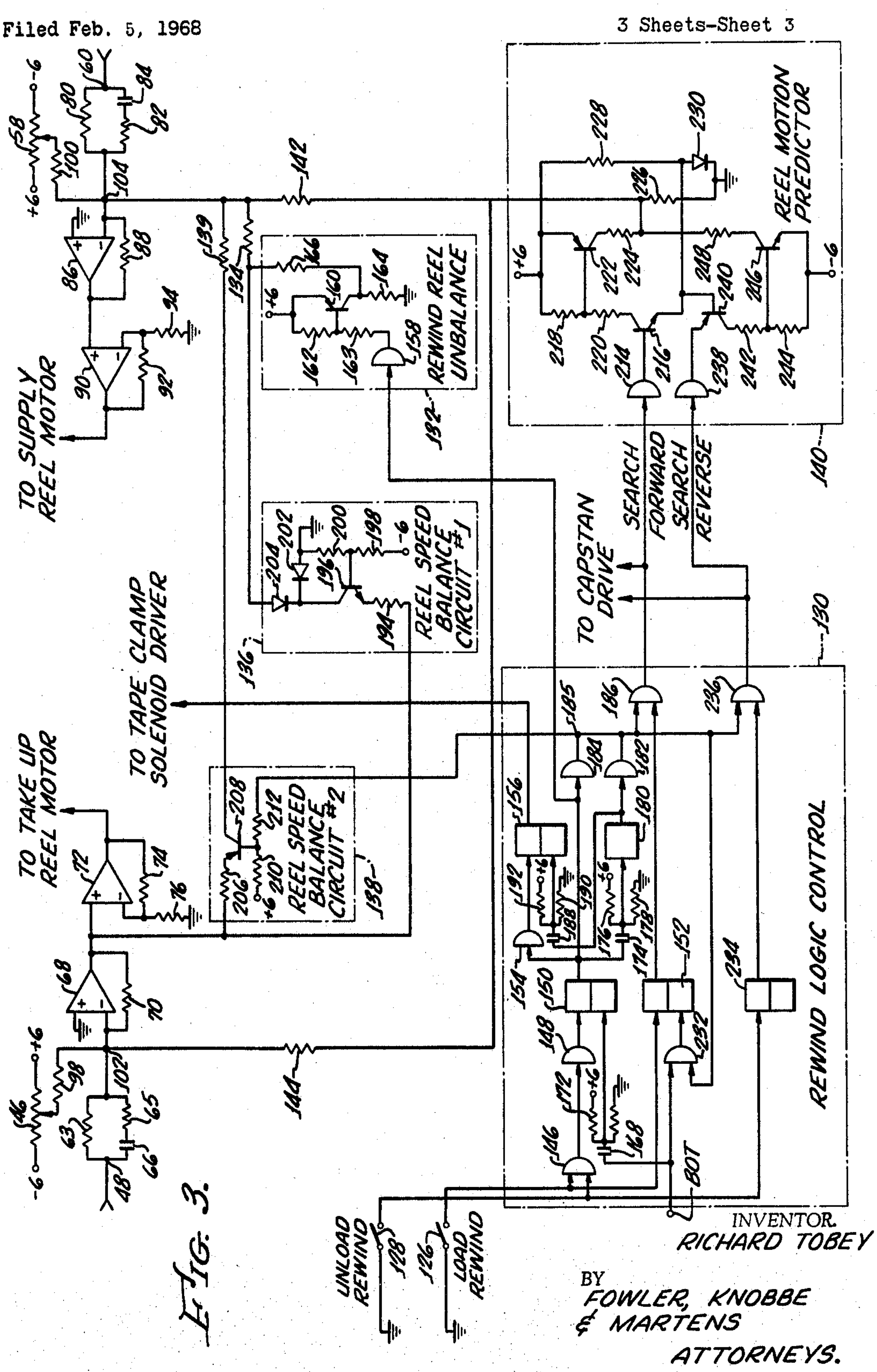
FIG. 3 is an electrical schematic of the circuitry comprising the present invention.

FIG. 3 is a circuit schematic of the blocks shown in FIG. 2 and described above. To initiate the load rewind sequence, load rewind switch 126 is actuated which grounds an input of NAND gate 146. A NAND gate such as 146 will have a true output—a positive voltage potential—when any of its inputs are false—a voltage potential near ground—and will have a false output only when all of its inputs are true. Accordingly, gate 146 will generate a true output to inverter 148 when switch 126 is actuated. The output of gate 146 is inverted by inverter 148 and applied as a one-set input to flip-flop 150. When the output of gate 146 becomes true, the output from inverter 148 will transition from a true voltage potential to a false potential. The flip-flops in FIG. 3 such as flip-flop 150 will be set or reset when their respective set or reset inputs transition from a true to a false state. Flip-flop 150, then, will be one-set when the load rewind switch 126 is actuated. The false to true transition of flip-flop 150 is inverted to a true to false transition by inverter 154 and applied as a one-setting input to flip-flop 156. The true to false transition of the output of inverter 154 will one-set flip-flop 156. The true output of flip-flop 156 is connected to the tape clamp solenoid driver 112 seen in FIG. 2. When flip-flop 156 is in a true state, tape clamp solenoid driver 112 actuates the tape clamp solenoid 110 for withdrawing the tape clamp 36 from the tape path, as previously discussed.

The output of flip-flop 150 is also inverted false by inverter 158 located in the rewind reel unbalance circuit 132. The output of inverter 158 is connected to the base of transistor 160 through resistor 163. The emitter of transistor 160 is connected to a positive voltage potential, for example, +6 volts. The base of transistor 160 is also connected to this positive voltage potential through resistor 162. The collector of transistor 160 is connected to summing junction 104 through resistors 166 and 134. When the output of inverter 158 is true, that is a positive voltage potential, the transistor 160 is biased off. However, when the output of flip-flop 150 becomes true and the output of inverter 158 becomes false, resistor 162 and 163 form a voltage divider between the positive voltage potential on the emitter of transistor 160 and the ground potential of the output of inverter 158 so that the base of transistor 160 is at a lower potential than its emitter, causing that transistor to conduct. The collector of transistor 160 is normally at ground potential but will raise to approximately +6 volts when transistor 160 is conducting. The voltage potential of the collector of transistor 160 is connected to summing junction 104 through resistors 166 and 134 and will result in the supply reel 12 being driven in a counterclockwise direction to transport tape from the take-up reel 14 to the supply reel 12 at a rapid rate.

During the high speed portion of a rewind sequence, that is, while circuit 132 is generating the signal applied to summing junction 104, the output from amplifier 68 in the take-up reel servo loop is cross-coupled through reel balance circuit 136 to the supply reel servo loop so that the rate at which tape is wound upon the supply reel 12 does not exceed the rate at which the take-up reel 14 can supply the tape. The output of amplifier 68 in the take-up reel servo loop is connected to the emitter of transistor 196 in the reel speed balance circuit 136 through resistor 194. The base of transistor 196 is connected to a negative voltage potential for example, −6 volts, through resistor 198 and is connected to ground through resistor 200. The collector of transistor 196 is connected to ground through diode 202 and to the summing junction 104 through diode 204 and resistor 134. During normal operation, the output of amplifier 68 will not exceed predetermined limits, for example ±1.5 volts. However, when the tape pack on supply reel 12 has built up to the point where even full speed rotation of the take-up reel 14 does not supply as much tape as the full speed rotation of supply reel 12 requires, the buffer arm 38 will begin to be biased inward and the take-up reel servo loop will not be able to return the buffer arm 38 to its null position. Under these conditions, the output of amplifier 68 will exceed −1.5 volts. Resistors 198 and 200 act as voltage dividers in the reel speed balance circuit 136 so that the base potential of transistor 196 is approximately −1 volt. Accordingly, when the output of amplifier 68 exceeds −1.5 volts, transistor 196 will become conductive. When transistor 196 becomes conductive, its collector will assume the same voltage as its emitter, or in this case, aproximately −1.5 volts. The voltage potential at the point between resistor 166, in the reel unbalance circuit 132, and resistor 134 is normally positive and approximately +6 volts during the high-speed portion of rewind. When the transistor 196 in circuit 136 becomes conductive, then, diode 204 is forward biased clamping the voltage at the point between resistors 166 and 134 to approximately −1.5 volts. The voltage at the summing junction 104 is therefore reduced, slowing down the supply reel 12 when transistor 196 in circuit 136 becomes conductive. Transistor 196 will remain conducting until the output from amplifier 68 again assumes a voltage potential within its normal operating limits indicating that the buffer arm 38 is again near its null position.

The output of BOT sensing circuit 124, seen in FIG. 2, is connected as an input to NAND gate 232 and through capacitor 168 to the reset input of flip-flop 150 located in rewind logic control 130 in FIG. 3. The normal state of the BOT signal is false. When the BOT tab 122 appears proximate the light source 118, FIG. 2, the BOT signal input to circuit 130 will become positive, causing capacitor 168 to charge positive. The BOT signal will return to a false level when the BOT tab 122 passes beyond the light source 118. This positive potential to ground potential transition of the BOT signal will discharge the capacitor 168, causing a negative pulse to occur on the reset input to flip-flop 150 resetting the flip-flop. The true output of flip-flop 150 is connected as an input to one-shot multivibrator 180 through capacitor 174. When the flip-flop 150 is reset, the true output will transition from a positive potential to ground potential causing a negative pulse input to one-shot 180 through capacitor 174. One-shot 180 will become one-set for a predetermined period of time then when flip-flop 150 becomes reset. The output of one-shot 180 is inverted false by inverter 182 and is also connected as a reset input to flip-flop 156 through capacitor 188. Capacitor 188 will become charged while the output of one-shot 180 is true and will discharge, generating a negative pulse input to flip-flop 156 when the output of one-shot 180 returns to its false state. The negative pulse input to flip-flop 156 will reset that flip-flop, resulting in the true output from flip-flop 156 becoming false and therefore deactuating the tape clamp solenoid 110.

The true output of flip-flop 150 is inverted by inverter 184 and connected as an input to NAND gate 186. The output of inverter 182 is tied to the output of inverter 184 and therefore also connected as an input to NAND gate 186. Accordingly, the voltage potential of node point 185 will be near ground when flip-flop 150 is true, which governs the high-speed portion of the rewind sequence, and also during the period of time following the occurrence of the BOT signal that one-shot 180 is true.

The outputs from inverters 184 and 182 are connected to the base of transistor 208 in the reel speed balance circuit 138 through resistor 212. The base of transistor 208 is connected to a positive voltage potential, for example +6 volts, through resistor 210. The emitter of the transistor is connected to the output of amplifier 68 through resistor 206. The collector of the transistor is connected to the summing junction 104 through resistor 139. So long as the voltage at point 185 is near ground potential, resistors 210 and 212 will act as voltage dividers so that the base of transistor 208 is at approximately +1 volt. Recall that the output of amplifier 68 will normally be within ±1.5 volts as long as the take-up reel servo loop maintains the buffer arm 38 at its null position. When the flip-flop 150 is reset and the reel unbalance signal generated by circuit 132 removed from the supply reel servo loop, the supply reel 12 will be rapidly decelerated. As previously discussed, the take-up reel servo may not be able to decelerate the take-up reel 14 as rapidly as supply reel 12 is decelerating and the buffer arm 38 will move toward its outer limit. Under this condition, the voltage output from amplifier 68 will exceed +1.5 volts, causing the transistor 208 to become conducting. When transistor 208 is conducting, its collector potential will become approximately the same as its emitter potential or about +1.5 volts. This positive potential is connected to the summing junction 104 through resistor 139 and will decrease the rate of deceleration of the supply reel 12 to a point where the take-up reel servo can maintain the buffer arm 38 proximate its null position.

The output of one-shot 180 will become false a predetermined period of time after the BOT signal has occurred. The false output of one-shot 180 is inverted true by inverter 182, removing the ground potential to reel speed balance circuit 138 and applying a positive potential to NAND gate 186. The true output of flip-flop 152, which was one-set when load rewind switch 126 was actuated, is a second input to NAND gate 186. NAND gate 186, therefore, will have a false output a predetermined period of time following the termination of the high-speed portion of the load rewind sequence.

The output of NAND gate 186 is connected as an input to capstan drive 116, seen in FIG. 2, and is also connected as an input to inverter 214 in the reel motion predictor 140. A false input to capstan drive 116 from NAND gate 186 will cause the capstan drive 116 to generate a drive signal to capstan motor 114 rotating the capstan drive shaft 34 in a counterclockwise direction to advance the tape from the supply reel 12 to the take-up reel 14.

The output of NAND gate 186 is inverted true by inverter 214 and connected to the base of transistor 216. The collector of transistor 216 is connected to the base of transistor 222 through resistor 220. The base of transistor 222 is connected to its emitter through resistor 218. The emitter of transistor 222 is connected to a positive voltage potential, for example, +6 volts. The emitter of transistor 216 is connected to the anode of diode 230 and also to the +6 volt potential through resistor 228. The cathode of diode 230 is tied to ground. The collector of transistor 222 is connected to ground through resistors 224 and 226. The output of the reel motion predictor 140 is the point between resistors 224, 248 and 226 and is connected to the summing junction 104 through resistor 142 and to the summing junction 102 through resistor 144. Transistor 216 is normally non-conducting but will become conductive when inverter 214 inverts the false output of NAND gate 186 true. The collector of transistor 216 will assume a voltage potential near ground when transistor 216 is conducting. With transistor 216 conducting, the voltage potential between resistors 218 and 220 will be reduced to less than +5.5 volts, causing transistor 222 to become conductive. The collector potential of transistor 222 will become approximately 6 volts when the transistor is conducting. The values of resistors 224 and 226 are selected so that when transistor 222 is conducting, the voltage potential between the resistors is approximately the collector potential of the transistor. Therefore, when the NAND gate 186 in rewind logic control 130 has a false output, which will cause the tape 18 to be advanced in a direction opposite to arrow 106 in FIG. 2, the reel motion predictor 140 will generate a positive voltage potential output to summing junctions 102 and 104. A positive potential input to summing junction 102 in the take-up reel servo loop will result in decreased torque to the take-up reel motor 78 until the buffer arm 38 has been biased outward to a position sufficient to null the voltage appearing at the summing junction 102. In a like manner, a positive potential applied to the summing junction 104 in the supply reel servo loop will result in an increased torque applied to supply reel motor 96 sufficient to bias the buffer arm 52 inward to null the voltage appearing at summing junction 104.

The voltage potential at point 185 in rewind logic control 130 is an input to NAND gate 232. As previously discussed, node point 185 will have a positive voltage potential a predetermined period of time after the termination of the high-speed portion of the rewind sequence, that is, after the BOT tab 122 has passed beyond the BOT sensing means 28. The second input to NAND gate 232 is the BOT signal as described above. The BOT signal is at ground potential until the BOT tab 122 again appears proximate the BOT sensing means, at which time it will assume a positive potential. When this occurs, the output from NAND gate 232 will become false since both of its inputs are true. The transition of the output of gate 232 will reset flip-flop 152 causing the true output of flip-flop 152 to become false. The output from gate 186, therefore, will become true when flip-flop 152 has been reset by the BOT tab 122 appearing a second time.

A true output from gate 186 to capstan drive 116 will stop the rotation of the capstan drive shaft 34 and disable the positive voltage potential generated by the reel motion predictor 140.

To initiate the unload rewind sequence, unload rewind switch 128 is actuated, placing a ground input to gate 146 and to the one-set input of flip-flop 234. As described above, a false input to gate 146 will cause flip-flop 150 to become set, resulting in the rewind reel unbalance circuit 132 generating a reel unbalance signal to summing junction 104 through resistor 134. This signal initiates the high-speed portion of the rewind sequence, causing tape to be transported from the take-up reel 14 to the supply reel 12 until the BOT tab 122 appears proximate the BOT sensing means. The BOT signal will reset flip-flop 150 terminating the reel unbalance signal from circuit 132 and one-setting one-shot 180 for a predetermined period of time. Flip-flop 156 will be reset by the output of one-shot 180 becoming false after this delay period, therefore deactuating the tape clamp solenoid 110. The voltage at node point 185 will become positive at the same time that the tape clamp is brought to bear against the capstan drive shaft 34.

The node point 185 is an input to NAND gate 236. A second input to gate 236 is the true output of flip-flop 234. A false output will be generated by gate 236 when both of its inputs are true.

The output of gate 236 is connected as an input to capstan drive circuit 116 and will cause the capstan drive motor 114 to rotate the drive shaft 34 in a clockwise direction, transporting tape from the take-up reel 14 to the supply reel 12 when it is false.

The output of gate 236 is also an input to inverter 238 in the reel motion predictor 140. The output of inverter 238 is connected to the emitter of transistor 240. The collector of transistor 240 is connected to the base of transistor 246 through resistor 242. The base of transitor 246 is connected to the emitter of that transistor through resistor 244. The emitter of transisor 246 is conneced to a negative voltage potential, for example, −6 volts. The collector of transistor 246 is connected to ground through resistors 248 and 226. The base of transistor 240 is connected to ground through diode 230.

Transistor 240 is normally non-conducting. When the false output of gate 236 is inverted true by inverter 238, transistor 240 will become conducting so that the voltage on the base of transistor 246 is raised to the point where that transistor will also conduct. The collector of transistor 246 will assume the same voltage potential as the emitter, −6 volts, when transistor 246 is conductive. The values of resistors 248 and 226 are selected so that the voltage at the point between the resistors is approximately the same as the collector of transistor 246. The output of reel motion predictor 140, then, will be a negative voltage potential when NAND gate 236 has a false output. The output of motion predictor 140 is connected to the summing junctions 102 and 104. A negative input to junction 102 will result in an increased torque applied to take-up reel motor 78 sufficient to bias the buffer arm 38 inward to return the voltage potential of summing junction 102 to approximately null. A negative voltage applied to summing junction 104 will result in a decreased torque applied to the supply reel motor 96 sufficient to cause the buffer arm 50 to bias outward nulling the voltage at summing junction 104.

I claim:

1. An improved tape transport comprising:
motor driven first and second tape reels;
a disengageable tape driving means for advancing tape between said reels;
first and second buffer tape storage means responsive to the tape supply between said first tape reel and said tape driving means and said second tape reel and said tape driving means, respectively, when said tape driving means is engaged to the tape and responsive to the tape supply between said first and said second tape reels when said tape driving means is disengaged from said tape for generating a signal proportional to the tape supplies;
first and second reel servo means responsive to the signals generated by said first and second buffer tape storage means, respectively, for generating a drive signal to said first and second tape reels, respectively, to maintain a predetermined tape supply;
a switch; and
rewind means responsive to the actuation of said switch for (i) disengaging said tape driving means from the tape, (ii) generating a reel unbalance signal to said second tape reel to cause tape to be advanced from said first tape reel to said second tape reel until a predetermined point on the tape appears proximate the capstan, and (iii) engaging said tape driving means to the tape.

2. The apparatus of claim 1 wherein said rewind means generates a drive signal to said capstan to advance tape from said first tape reel to said second tape reel after said tape driving means has been engaged to the tape.

3. The apparatus of claim 1 wherein said rewind means generates a drive signal to said capstan to advance tape from said second tape reel to said first tape reel until a predetermined point appears proximate the capstan after said tape driving means has been engaged to the tape.

4. The apparatus of claim 1, further including:
first reel speed balancing means responsive to said drive signal to said first tape reel for reducing said reel unbalance signal to a predetermined level, reducing the speed of said second tape reel, when said drive signal to said first tape reel exceeds a predetermined level which indicates that said second reel is demanding tape from said first reel faster than said first reel can supply.

5. The apparatus of claim 1 wherein said rewind means includes:
a first binary which is set to a first state when said switch is actuated and reset to a second state when said predetermined point on the tape appears proximate the capstan;
a time delay means responsive to said first binary for generating an output for a predetermined period of time after said first binary assumes its second state; and, a second binary which is set to a first state when said first binary assumes its first state and reset to a second state when the output of said time delay means terminates, said tape driving means being disengaged from the tape when said second binary is in its first state and engaged to the tape when said second binary is in its second state.

6. The apparatus as described in claim 5 wherein said rewind means further includes reel unbalance means for generating said reel unbalance signal to said second reel, said unbalance means is enabled when said first binary is in its first state.

7. The apparatus as described in claim 6, further including second reel speed balancing means which is enabled (i) when said first binary is in its first state, and (ii) when said time delay means has an output, said second reel speed balancing means, while enabled, is responsive to said drive signal to said first tape reel for generating a drive signal to said second tape reel, to speed up said reel, when said drive signal to said first reel exceeds a predetermined level, indicating that said first reel is not decreasing in speed as fast as said second reel.

8. The apparatus as described in claim 6 wherein said rewind means further includes a third binary which is set to a first state when said switch is actuated, said rewind means generates said drive signal to said capstan to advance tape from said first tape reel to said second tape reel when (i) said first binary is in its second state, (ii) the output by said time delay means has terminated, and (iii) said third binary is in its first state.

9. The apparatus as described in claim 8 further including a reel motion predicting means, responsive to the drive signal generated by said rewind means to said capstan, for generating a signal to both said first and second reel servo means for altering the drive signals applied to said tape reels by said servo means to cause the tape supply between said first tape reel and said tape driving means to be decreased and the tape supply between said second tape reel and said tape driving means to be increased.

10. The apparatus as described in claim 6 wherein said rewind means further includes a third binary which is set to a first state when said switch is actuated and reset to a second state when (i) said first binary is in its second state, (ii) the output of said time delay means has terminated, and (iii) a predetermined point on the tape appears proximate said capstan, rewind means generates said drive signal to said capstan to advance tape from said second reel to said first reel when (i) said first binary is in its second state, (ii) the output of said time delay means has terminated, and (iii) said binary is in its first state, said drive signal to said capstan terminates when said third binary is rest to its second state.

11. The apparatus as described in claim 10 further including a reel motion predicting means, responsive to the drive signal generated by said rewind means to said capstan, for generating a signal to both said first and second reel servo means for altering the drive signals applied to said tape reels by said servo means to cause the tape supply between said first tape reel and said tape driving means to be decreased and the tape supply between said second tape reel and said tape driving means to be increased.

12. A magnetic tape transport comprising:

motor driven take-up and supply reels;

capstan means for driving said tape between said take-up and supply reels;

buffer tape storage means responsive to the tape supply between said take-up reel and said capstan means and capstan means and said supply reel for generating signals proportional said tape supplies;

reel servo means responsive to the signals generated by said buffer tape storage means for generating drive signals to said motor driven take-up and supply reels to maintain a predetermined tape supply between said reels and said capstan means;

control means for selectively rotating said capstan in one direction to transport tape from said supply to said take-up reel and in the opposite direction to transport tape from said take-up reel to said supply reel; and, reel motion predicting means responsively coupled to said control means and operatively coupled to said reel servo means for altering the drive signals to said tape reels to increase the tape stored between said capstan and the tape reel receiving the tape and decrease the tape stored between said capstan and the tape reel supplying the tape.

13. The apparatus as described in claim 12, wherein said reel motion predicting means momentarily alters the drive signal applied to the tape reel receiving the tape to increase the tape supply between said capstan and said tape reel receiving the tape and momentarily alters the drive signal applied to the tape reel supplying the tape to reduce the tape supply between said capstan and said tape reel supplying the tape.

References Cited

UNITED STATES PATENTS

| | | | |
|---|---|---|---|
| 2,952,415 | 9/1960 | Gilson | 242—55.12 |
| 3,189,291 | 6/1965 | Welsh | 242—55.12 |
| 3,203,635 | 8/1965 | Rayfield et al. | 242—55.12 |

LEONARD D. CHRISTIAN, Primary Examiner

U.S. Cl. X.R.

318—7

UNITED STATES PATENT OFFICE

CERTIFICATE OF CORRECTION

Patent No. 3,478,985 November 18, 1969

Richard Tobey

It is certified that error appears in the above identified patent and that said Letters Patent are hereby corrected as shown below:

Column 2, line 9, "positoning" should read -- positioning --. Column 3, line 30, "asignee" should read -- assignee --. Column 4, line 47, "of" should read -- on --. Column 6, line 40, "response" should read -- respond --. Column 7, line 53, "tape-up" should read -- take-up --. Column 13, line 54, after "said" insert -- third --; line 56, "rest" should read -- reset --.

Signed and sealed this 2nd day of June 1970.

(SEAL)
Attest:

Edward M. Fletcher, Jr.
Attesting Officer

WILLIAM E. SCHUYLER, JR.
Commissioner of Patents